United States Patent
Steinhauer et al.

(10) Patent No.: US 9,519,048 B2
(45) Date of Patent: Dec. 13, 2016

(54) HIGH-FREQUENCY CIRCUIT HAVING CROSSED LINES

(71) Applicant: Robert Bosch GmbH, Stuttgart (DE)

(72) Inventors: Matthias Steinhauer, Steinheim (DE); Juan Pontes, Stuttgart (DE); Oliver Brueggemann, Oelbronn-Duerrn (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 14/509,628

(22) Filed: Oct. 8, 2014

(65) Prior Publication Data

US 2015/0097720 A1 Apr. 9, 2015

(30) Foreign Application Priority Data

Oct. 8, 2013 (DE) .................... 10 2013 220 254

(51) Int. Cl.
*G01S 7/02* (2006.01)
*G01S 13/02* (2006.01)
*H01P 3/08* (2006.01)
*H01Q 1/32* (2006.01)
*G01S 7/03* (2006.01)
*G01S 13/93* (2006.01)
*H01Q 21/08* (2006.01)

(52) U.S. Cl.
CPC .................. *G01S 7/02* (2013.01); *G01S 7/032* (2013.01); *G01S 13/02* (2013.01); *G01S 13/931* (2013.01); *H01P 3/081* (2013.01); *H01Q 1/3233* (2013.01); *H01Q 21/08* (2013.01)

(58) Field of Classification Search
CPC .......... G01S 7/02; G01S 7/032; G01S 13/931; G01S 13/02; H01Q 1/3233; H01Q 21/08; H01P 3/081

USPC ............................................. 342/175, 70–72
See application file for complete search history.

(56) References Cited

U.S. PATENT DOCUMENTS

| | | | |
|---|---|---|---|
| 5,512,901 A * | 4/1996 | Chen ....................... | G01S 7/032 342/175 |
| 7,898,480 B2 * | 3/2011 | Ebling .................. | G01S 13/931 343/700 MS |
| 8,018,375 B1 * | 9/2011 | Alexopoulos .......... | H01Q 19/10 342/175 |
| 9,024,417 B2 * | 5/2015 | Rollin ....................... | H01P 3/06 257/664 |

(Continued)

OTHER PUBLICATIONS

B. Al-Khateeb, V. Rabinovich, B. Oakley and N. Alexandrov, "Compact planar antennas for short-range wireless automotive communication," in IEEE Transactions on Vehicular Technology, vol. 55, No. 4, pp. 1425-1435, Jul. 2006.*

*Primary Examiner* — John B Sotomayor
(74) *Attorney, Agent, or Firm* — Norton Rose Fulbright US LLP; Gerard Messina

(57) ABSTRACT

A high-frequency circuit is described as having lines crossing each other on a printed circuit board for high-frequency signals, wherein the sections of the lines, lying on both sides of a crossing point as well as a coupler forming the crossing point are situated in a common plane on the printed circuit board and the sections of the lines are connected to four ports of the coupler situated in a quadrangle, which are connected to one another via a plurality of coupling paths in such a way that the components of a signal supplied at a port, which propagate on various coupling paths, interfere destructively at the adjacent ports and constructively at the diagonally opposite port.

6 Claims, 2 Drawing Sheets

(56) References Cited

U.S. PATENT DOCUMENTS

| | | | |
|---|---|---|---|
| 2005/0190101 A1* | 9/2005 | Hiramatsu | H01Q 13/24 |
| | | | 342/175 |
| 2005/0225481 A1* | 10/2005 | Bonthron | G01S 7/032 |
| | | | 342/175 |
| 2006/0145778 A1* | 7/2006 | Pleva | H01P 5/107 |
| | | | 333/26 |
| 2012/0032836 A1* | 2/2012 | Shamim | G01S 7/03 |
| | | | 342/175 |
| 2013/0214871 A1* | 8/2013 | Nakamura | H01P 1/16 |
| | | | 333/26 |
| 2015/0035616 A1* | 2/2015 | Brueggemann | H01P 5/227 |
| | | | 333/117 |
| 2015/0097720 A1* | 4/2015 | Steinhauer | G01S 7/02 |
| | | | 342/175 |

* cited by examiner

HIGH-FREQUENCY CIRCUIT HAVING CROSSED LINES

FIELD OF THE INVENTION

The present invention relates to a high-frequency circuit having lines, for high-frequency signals, which are situated crossing each other on a printed circuit board.

BACKGROUND INFORMATION

Such high-frequency circuits are used, among others things, in radar technology, for instance in radar sensors, which are used in motor vehicles to measure distances and relative speeds of preceding vehicles, in order to make possible an automatic collision warning or a distance control.

The high-frequency circuit then typically includes a number of feeder lines which connect a number of antenna patches, that are situated on the same printed circuit board, to associated oscillators and evaluation circuits. In the case of transmitting antennas, in order to achieve a certain angular distribution of the radiation transmitted, it is often desirable to feed a plurality of groups of antenna elements that are situated interspersed or interleaved with signals which differ in their phase, amplitude and/or frequency. If the antenna patches form only two groups, it is possible to link up the feeder lines from different sides to the series of antenna elements, so that crossings of the feeder lines are able to be avoided. Frequently, however, it is desirable or required, for reasons of space or based on other boundary conditions, that the antenna patches are fed starting from the same side. In antenna arrangements having three or more separately fed groups, crossings of the feeder lines are unavoidable.

In principle, it is possible to implement a crossing position by guiding the feeder lines crossing one another in various planes in the printed circuit board. However, this requires a relatively costly high-frequency-suitable printed circuit board having a plurality of wiring planes.

One possible alternative is to mount an additional element at the crossing position which forms a bridge for one of the lines. This design approach is, however, also relatively costly and requires additional installation space which, under certain installation conditions, will not be available.

SUMMARY

It is an object of the present invention to create a cost-effective and compact high-frequency circuit having lines crossing one another.

This object is attained in that sections of the line, lying on both sides of a crossing point, as well as a coupler forming the crossing point are situated in a common plane of the printed circuit board and the section of the lines are connected to four ports of the coupler situated in the quadrangle, which are connected to one another via a plurality of coupling paths in such a way that the components of a signal supplied at a port, which propagate on various coupling paths interfere destructively at the adjacent ports and constructively at the diagonally opposite port.

The present invention permits implementing a crossing point having only one single wiring plane, without the signals on the lines, which cross, interfering with each other.

The feature, that the ports are to be situated in the quadrangle, is not to be understood geometrically in this case but topologically, i.e. each port has only two direct neighbors, and the ports form two pairs of ports, opposite to each other, which are not adjacent.

DETAILED DESCRIPTION

Figure 1:
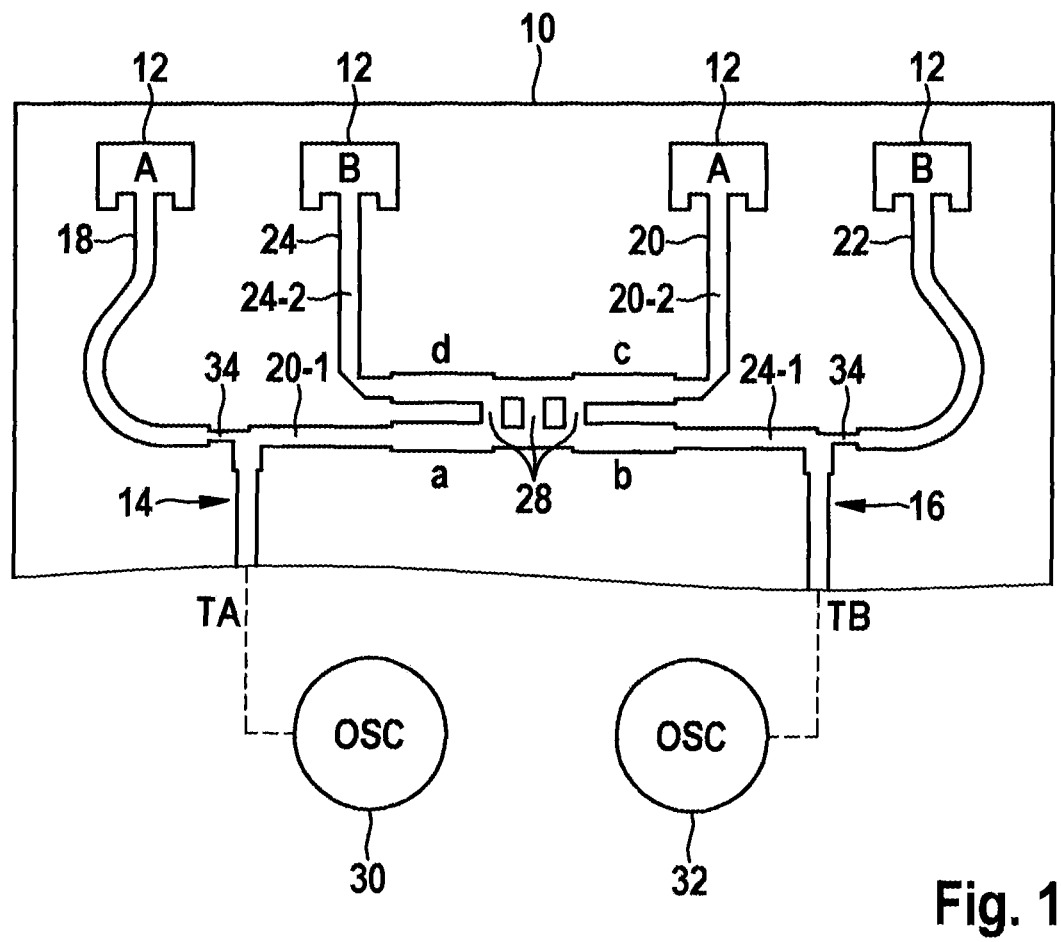
FIG. 1 shows a partial view of a printed circuit board showing a simple example of a high-frequency circuit according to the present invention.

FIG. 1 shows a subsection of a high-frequency-capable printed circuit board 10, on which a conductor pattern is formed of microstrip lines which form a high-frequency circuit. In the example shown, printed circuit board 10 is a printed circuit board of a radar sensor, on which four antenna patches 12 are situated, which are used for sending radar signals.

The high-frequency circuit is used for feeding two different high-frequency signals (radar signals) TA and TB into antenna patches 12. In this context, antenna patches 12 form two interleaved groups A and B, which are respectively to send one of the two high-frequency signals TA and TB. Accordingly, the high-frequency circuit forms a first line 14, which is used to supply high-frequency signal TA to the antenna patches of group A, and a second line 16, which is used to supply high-frequency signal TB to the antenna patches of group B. Line 14 has a first branch 18, which leads to the antenna element of group A at the left end, in FIG. 1, of the series of antenna patches, and a branch 20, which leads to the other antenna patch of group A (the third patch from the left). Correspondingly, line 16 has a first branch 22, which leads to the antenna patch of group B at the right end of the series, and a branch 24, which leads to the other patch of group B (the second patch from the left).

Since the feeding of antenna patches 12 situated in a row is to take place only from a single side of this series, branches 20 and 24 have to cross each other on one side. The crossing point is formed by a coupler 26, and subdivides branch 20 into a first section 20-1 and a second section 20-2, which leads from the crossing point to antenna patch 12. In the same way, the coupler subdivides branch 24 into a first section 24-1 and a second section 24-2, which leads from the crossing point to antenna patch.

Coupler 26 has two parallel lines of which one connects sections 20-1 and 24-1 to each other, while the other connects sections 20-2 and 24-2. These two parallel lines are connected to each by three parallel coupling paths 28. Consequently, coupler 26 is configured as a quadripole and has four ports a, b, c, d each of which is connected to one of sections 20-1, 24-1, 20-2, 24-2. Port a is adjacent to ports b and d and is diagonally opposite to port c. Correspondingly, port b is adjacent to ports a and c and is diagonally opposite to port d.

High-frequency signals TA and TB are able to differ in their amplitude and/or their phase. They may also differ, however, in their frequency (slightly), which is symbolized in FIG. 1 by two separate oscillators 30, 32 being provided to generate the high-frequency signals. The two oscillators are controlled by a common control circuit (not shown) and may be phase-locked with each other. Provided high-frequency signals TA and TB differ only in their phase, they may also be fed from a common oscillator, a phase shifter being provided for setting the phase shift.

The frequencies of the two high-frequency signals may be different, to be sure, but they are of the same order of magnitude, for instance, of the order of magnitude of 76 to 77 GHz. In the following we shall therefore assume that the microwaves, which propagate on the microstrip lines of the high-frequency circuit, have a fixed and known wavelength λ. The lengths of the parallel lines and of coupling paths 28 of coupler 26 are tuned to this wavelength λ in such a way that the signals at ports a-d of the coupler interfere either constructively or destructively.

The high-frequency signal TA, which is initiated in the coupler via port a, is able to get to port d via each of the three coupling paths 28. In this context, the run lengths are set so that destructive interference comes about at port d, with the result that signal TA does not reach branch 24-2 and thus does not excite the antenna patch of group B. In the propagation of the signal from port a to diagonally opposite port c, by contrast, the run length differences lead to constructive interference, so that signal TA is conducted on undiminished to branch 20-2 and to the connected patch of group A. At port b, which is opposite port d, destructive interference then comes about again.

Correspondingly, for high-frequency signal TB, which is fed into port b, one will obtain constructive interference at opposite port d and destructive interference at both the adjoining ports a and c. All in all, it is achieved in this manner that signal TA gets exclusively to the antenna patches of group A, and signal TB exclusively to the patches of group B. In the final analysis, this is equivalent to an arrangement in which lines 14 and 16 (or more precisely, their branches 20 and 24) are run so as to cross each other and are galvanically insulated from each other. The advantage of the system according to the present invention is, however, that the microstrip lines of the entire high-frequency circuit are able to lie in a single plane on the printed circuit board.

In a radar sensor having a monostatic antenna concept, antenna patches 12 are also used as receiving antennas at the same time, and the received signals have to be conducted on via the high-frequency circuit to evaluation circuits (not shown), which are connected via couplers (not shown) to the sections of lines 14, 16, which lead to oscillators 30, 32. Based on the symmetry of coupler 26, it applies also in this case that the signals received by the patches of group A exclusively get into line 14, while the signals received by the antenna patches of group B get exclusively into line 16.

In the exemplary embodiment shown, coupler 26 is combined with power splitters 34 which determine how the power of high-frequency signal TA is subdivided to branches 18 and 20, and how the power of high-frequency signal TB is subdivided to branches 22 and 24. Adapter and power splitter patterns may optionally also be integrated in couplers 26.

However, while in the example shown each coupler has three parallel coupling paths 28, specific embodiments are also possible in which each coupler has a larger (preferably uneven) number of coupling paths.

Figure 2:
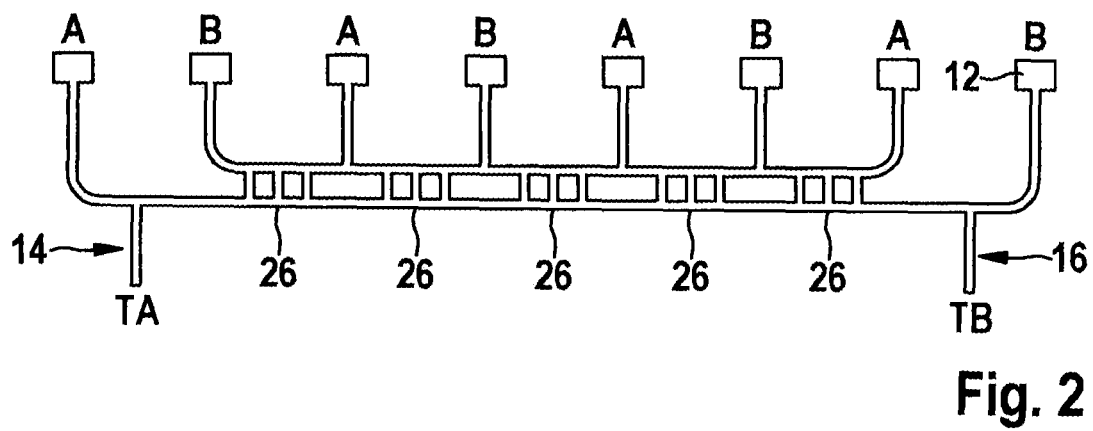
FIGS. 2 & 3 show a conductor pattern of high-frequency circuits according to additional exemplary embodiments of the present invention.

The principle illustrated in FIG. 1 is able to be broadened to high-frequency circuits having more than only one crossing point. As an example, FIG. 2 shows a feeder circuit for a series of eight antenna patches 12, which alternately belong to group A and a group B. In this case, lines 14 and 16 have five crossing points, which are each formed by a coupler 26.

Figure 3:
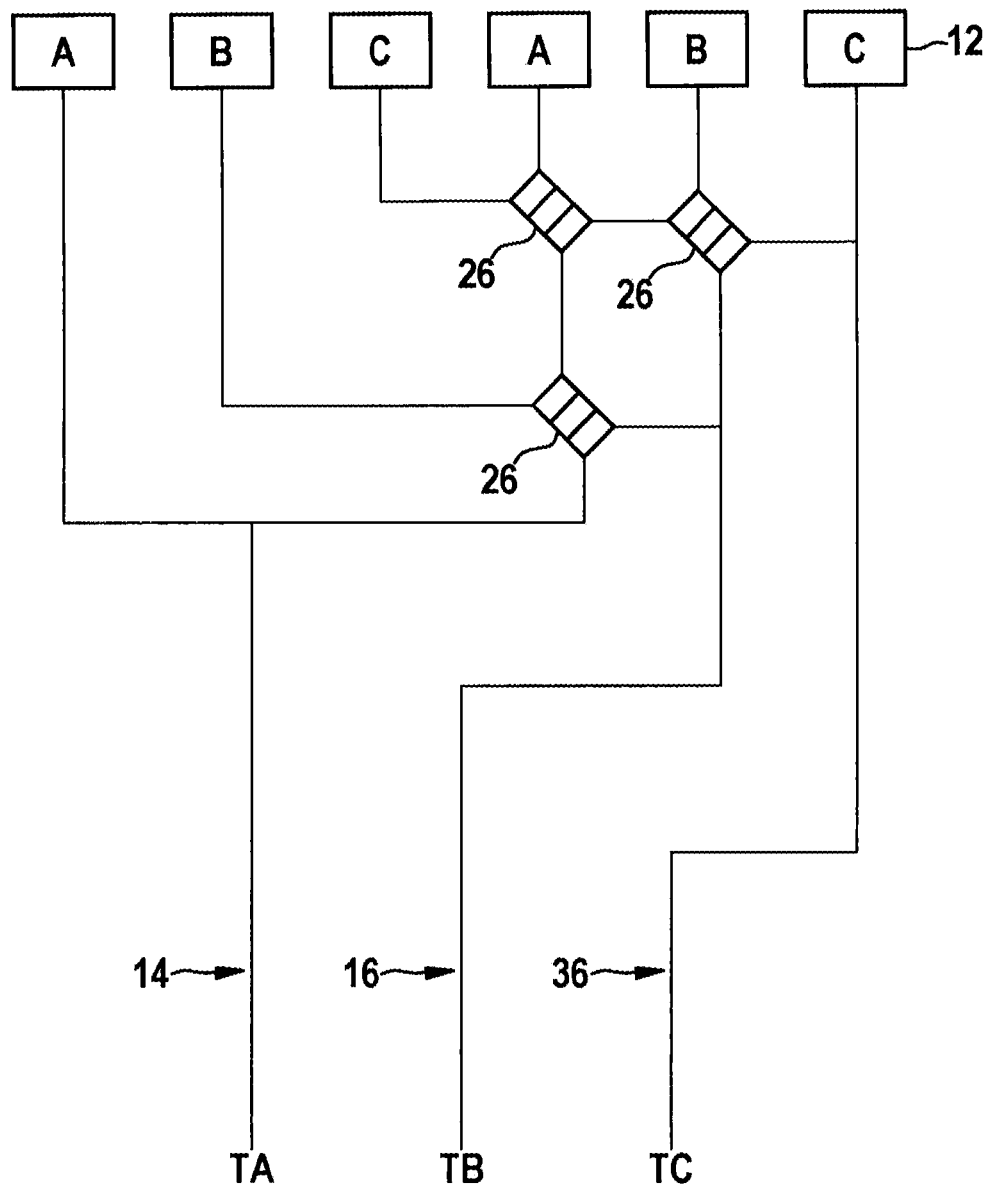

As a further example, FIG. 3 shows an high-frequency circuit for six antenna patches 12, which form three interleaved groups A, B and C. A third high-frequency signal TC is fed into the patches of group C. In addition to lines 14 and 16, an additional branched line 36 is therefore provided. The crossings between the various branches of these three lines are again formed by couplers 26.

What is claimed is:

1. A high-frequency circuit, comprising:
   a printed circuit board; and
   lines crossing each other on the printed circuit board for high-frequency signals, wherein:
   sections of the lines lying on both sides of a crossing point, as well as a coupler forming the crossing point are situated in a common plane on the printed circuit board,
   the sections of the lines are connected to four ports of the coupler situated in a quadrangle, and
   the four ports are connected to one another via a plurality of coupling paths in such a way that components of a signal supplied at a port (a), which propagate on various coupling paths, interfere destructively at adjacent ports (b, d) and constructively at a diagonally opposite port (c).

2. The high-frequency circuit as recited in claim 1, wherein the coupler has two parallel lines, wherein opposite ends of the two parallel lines form the four ports, the two parallel lines being connected to one another by an uneven number of parallel coupling paths.

3. The high-frequency circuit as recited in claim 2, wherein the coupler has exactly three coupling paths.

4. The high-frequency circuit as recited in claim 1, wherein the lines are developed as microstrip lines.

5. A radar sensor, comprising:
   a printed circuit board;
   a plurality of antenna patches situated on the printed circuit board, wherein the antenna patches form a plurality of groups interleaved with one another;
   a feeder circuit for supplying high-frequency signals which differ from one another from group to group, to the antenna patches, wherein the feeder circuit is a high-frequency circuit including:
   the printed circuit board; and
   lines crossing each other on the printed circuit board for high-frequency signals, wherein:
   sections of the lines lying on both sides of a crossing point, as well as a coupler forming the crossing point are situated in a common plane on the printed circuit board,
   the sections of the lines are connected to four ports of the coupler situated in a quadrangle, and
   the four ports are connected to one another via a plurality of coupling paths in such a way that components of a signal supplied at a port (a), which propagate on various coupling paths, interfere destructively at adjacent ports (b, d) and constructively at a diagonally opposite port (c).

6. The radar sensor as recited in claim 5, wherein the radar sensor is for a motor vehicle.

* * * * *